June 18, 1940.  D. C. SHARP  2,204,915

STUFFING GLAND

Filed Nov. 4, 1938

Inventor
DUDLEY C. SHARP.
Jesse R. Stone
Lester B. Clark
By
Attorneys.

Patented June 18, 1940

2,204,915

UNITED STATES PATENT OFFICE 2,204,915

STUFFING GLAND

Dudley C. Sharp, Houston, Tex., assignor to Mission Manufacturing Company, Houston, Tex., a corporation of Texas Application November 4, 1938, Serial No. 238,735

2 Claims. (Cl. 286—26)

The invention relates to a stuffing box or gland which is adapted to pack off pressures around a reciprocating or rotating rod or shaft.

In the usual type of stuffing box where a resilient packing is provided it has been found that the operators usually so tighten the stuffing box that the packing member is compressed to such an extent that it becomes distorted and destroyed. This is particularly true in connection with lip type packings where the lip must be free to flex under the application of pressure in order to provide a seal.

It is one of the objects of the present invention to provide a support ring for the lip type packing so that the thrust on the packing will be absorbed by such ring and the lip will remain free to provide a seal.

Another object of the invention is to provide engaging parts upon a support ring and packing member so as to force the member into sealing position against the outside of the recess in which it is carried while a flexible lip thus projects to provide a seal on the inside of the packing.

It is also an object of the invention to provide a packing having a shoulder on the outer periphery thereof which is spaced from a flexible sealing lip on the end of the packing.

Other and further objects of the invention will be readily apparent when the following description is considered in connection with accompanying drawing wherein.

Figure 1:
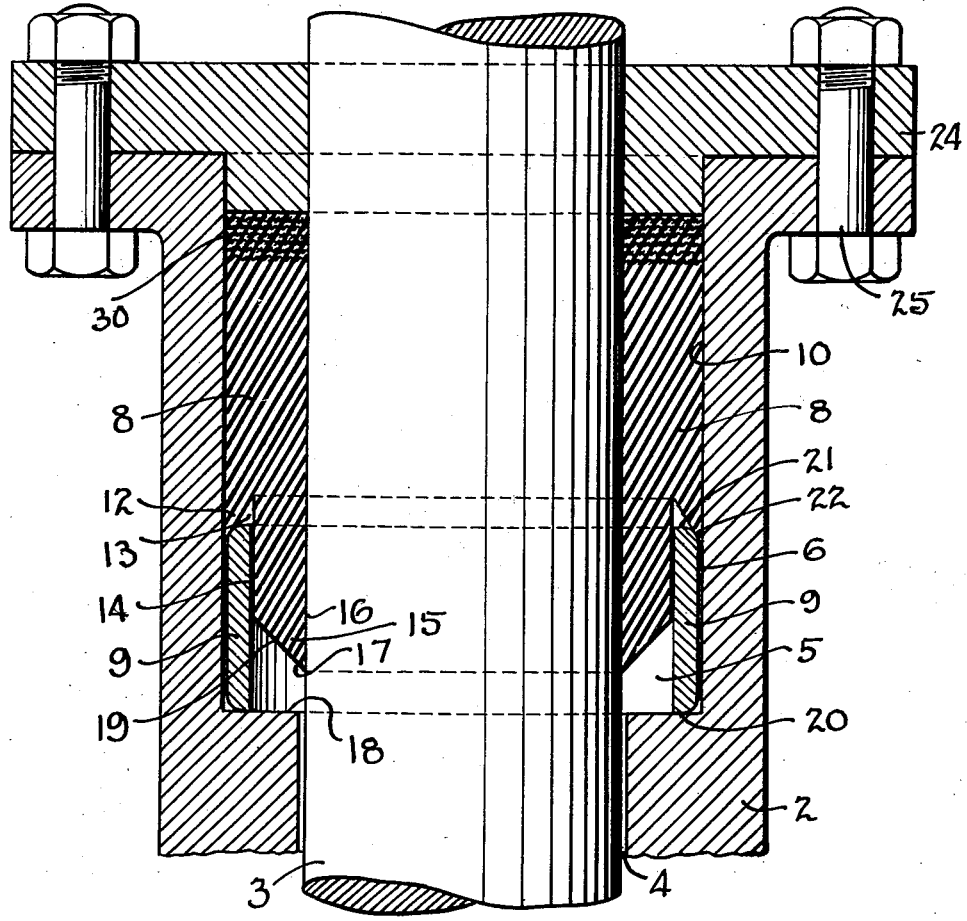
Fig. 1 is a transverse section thru a stuffing box to which the invention has been applied and illustrates the arrangement of the packing and the support ring so as to permit a sealing to be performed by the lip on the packing.
Figure 2:
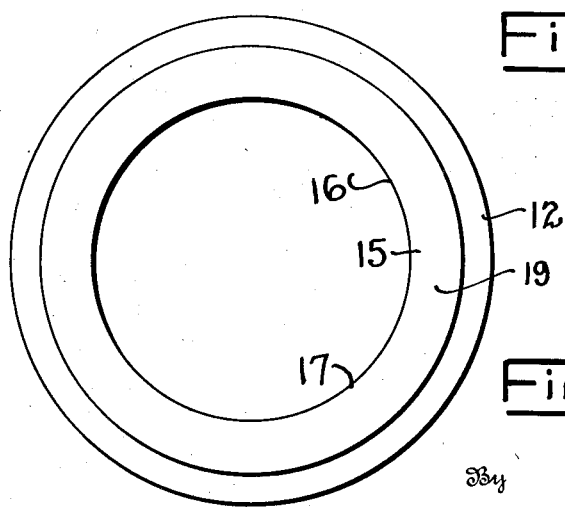
Fig. 2 is an end elevation of the packing member illustrating the lip and the shoulder which are provided thereon.

In Fig. 1 a body 2 has been illustrated which may be a portion of any desired piece of equipment which carries a rod or shaft 3 which is rotated or reciprocated and around which a seal is to be maintained.

It is contemplated that the pressure will be available along the shaft 3 by entering the opening 4 in the body 2 so that such pressure may be available in the chamber 5 which is provided by a recess 6 in the body 2. The recess 6 may be of any desired size or shape so long as it is adapted to receive the packing member 8 and the support ring 9 in position about the periphery of the shaft or rod 3. The recess 6 has an inside wall 10 which is arranged to snugly receive the packing member 8.

The packing member is of a particular construction in that a shoulder 12 has been provided on the periphery thereof spaced from each end of the packing. This shoulder 12 is outwardly and downwardly inclined as seen in Fig. 1 to provide a thin peripheral edge defined by the groove 13. The packing continues beyond the shoulder and has a periphery 14 of somewhat reduced diameter. This reduced portion merges into a flexible lip 15 which has a sealing surface 16 to engage with the periphery of the rod or shaft 3.

With packings of this type the point 17 of the lip is often forced inwardly in the recess such as 6 to such an extent that the lip engages against the bottom 18 of the recess and causes the lip to buckle or fold so that it is moved away from the periphery of the shaft. Such buckling destroys the sealing action of the lip because the pressure of the chamber 5 is exerted against the face 19 so as to force the lip into sealing position. In this manner an automatic seal is maintained because any variation in the pressure would also vary any applied pressure to the lip 15.

With the present invention the support ring 9 is of rigid material such as metal and is of such height that when the lower edge 20 rests upon the bottom 18 the upper edge 21 is disposed inside of the groove 13 and behind the shoulder 12. It should be noted that the outer upper edge 22 of this ring is slightly rounded so that the top of the shoulder 12 may fit about the rounded edge 22. In this manner the shoulder 12 will be forced outwardly against the wall 10 of the recess 6 and provide a seal to prevent any flow of pressure outwardly through the recess between the packing and the wall of the body. Any desired pressure can be applied to the packing member 8 by a cap or cover 24 which is held in position by a series of bolts 25. The thrust on the packing is thus absorbed by the support ring 9 and the greater the pressure applied to the packing member the greater will be the wedging movement of the shoulder 12 against the ring 9. Inasmuch as there is no movement between the shoulder 12 and the wall 10 of the recess, an excessive pressure at this point is immaterial.

It will be noted that the lip 15 extends downwardly inside of the support ring 9 and has no axial pressure applied thereto insofar as the cap 24 is concerned. This leaves the lip 15 free to seal against the periphery of the shaft and prevent any flow of pressure along the shaft or rod. Inherent resiliency of the lip 15 plus the pressure on the inclined face 19 tends to provide a seal along the shaft.

In order to prevent extrusion of the resilient material of the packing 8 due to the accumulation of any pressure against the packing, a reinforcing fabric 30 has been applied to the outer end thereof so that it will absorb the thrust of the cap member 24.

Broadly the invention contemplates a packing gland wherein a resilient packing is supported so that the thrust thereon of retaining it in position is used to form a seal on the outer periphery and the seal along the inner periphery is accomplished by the packed pressure being applied to a flexible lip.

What is claimed new is:

1. A stuffing box assembly including a body having a recess therein, a rod or shaft projecting through said recess, packing disposed in said recess and about said rod or shaft, a peripheral shoulder intermediate the ends of said packing, a cylindrical surface on said packing extending downwardly from said shoulder and merging into a flexible sealing lip at the lower end of the packing, said shoulder being inclined outwardly and downwardly and forming a thin peripheral edge on the body, a support ring fitting closely about said cylindrical surface and abutting said shoulder, said ring being of a greater height than the length of the cylindrical surface and flexible lip so as to provide a chamber within the ring and below said lip and a cap member attached to said body to hold the packing in place with the peripheral edge overlying the top end of said ring and in sealing engagement with the walls of the body recess.

2. A stuffing box assembly including a body having a recess therein, a rod or shaft projecting through said recess, packing disposed in said recess and about said rod or shaft, an inwardly inclined peripheral shoulder on said packing intermediate its ends and forming a peripheral edge thereon, said packing including a cylindrical portion extending downwardly from said shoulder and merging into a flexible lip to be forced against the rod or shaft by the pressure being packed, a support ring fitting closely about said cylindrical portion, said ring being of a greater width than the cylindrical portion and flexible lip and having a rounded edge portion to engage said shoulder, and a cap member attached to the body and applying pressure to the body to bring the peripheral lip into sealing engagement with the walls of the body recess.

DUDLEY C. SHARP.